G. DAVIS.
Horse Rake.
No. 1,258.
Patented July 22, 1839.
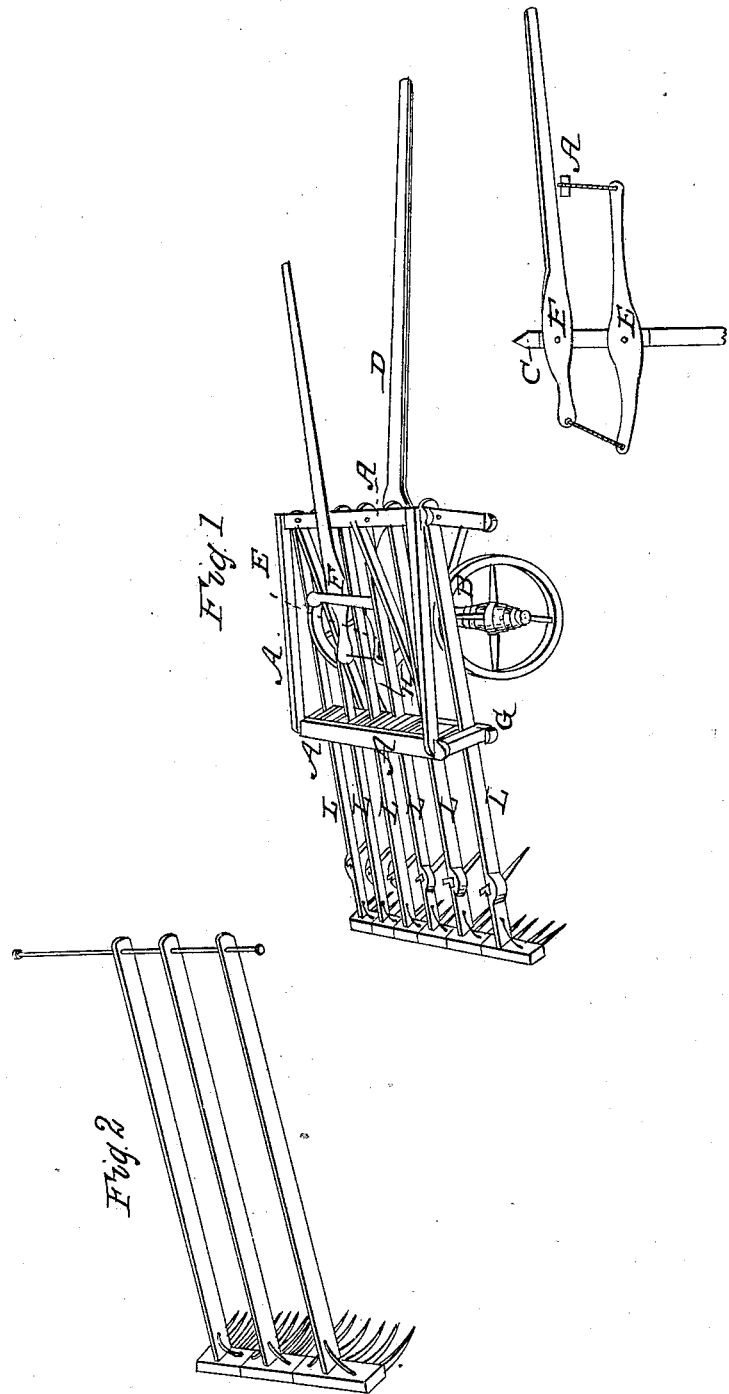

UNITED STATES PATENT OFFICE.

GEO. DAVIS, OF BELMONT COUNTY, OHIO.

IMPROVEMENT IN HAY-RAKES AND GRAIN-HARROWS.

Specification forming part of Letters Patent No. 1,258, dated July 22, 1839.

*To all whom it may concern:*

Be it known that I, GEORGE DAVIS, of Belmont county and State of Ohio, have invented a new and useful Improvement in Machines for Raking Hay and Harrowing in Grain, which is described as follows, reference being had to the annexed drawings, making a part of this specification.

Figure 1 represents a perspective view of the machine. Fig. 2 represents rakes for harrowing detached from the frame.

This machine consists of a frame, A A A A, (placed on common cart-wheels,) of suitable size and strength constructed in the following manner: First, there are two curved sills, H H, which compose a part of the frame. Attached to these sills are two transverse sills, c c, in which are inserted upright timbers which are mortised into the transverse plates A A (composing a part of the frame) at suitable distances to receive the rakes, (letter L.) The rakes, being inserted, are secured between the forward upright timbers by means of an extended rod passing through the timbers and the ends of the rakes, as described in Fig. 2. The curved sills H H are attached to the axle B by means of hinges, for the purpose of tilting the frame. The tilting of the frame, which causes the rakes to rise or sink, for the purpose hereinafter mentioned, is produced by means of the lever F, passing through an upright post, C, which post is inserted in the tongue D between the hounds, and is secured by a bolt on which it vibrates. Immediately under the lever F is a walking-beam, E, which also passes through the upright post C, and is secured in the same manner as the lever F. The end of the lever F nearest the fulcrum is attached to one end of the walking-beam E by means of a chain or cord, and the other is attached to the forward transverse plate A of the frame by the same method. The heads of the rakes, (letter L,) not being confined to each other, rise and sink separately, according to the nature of the ground which they pass over in order to "make clean work."

The manner in which the teeth are arranged is the same as in ordinary rakes, except the insertion of a single tooth in each rake forward of the heads in the handle, (so termed,) for the purpose of raking the burden from the teeth inserted in the heads of the rakes. The forward teeth can be raised or lowered in the mortise in which they are inserted, and secured by means of keys, as occasion may require. These teeth are not to touch the ground, but only to take the burden, as before described.

When the heads of the rakes are to be elevated for the purpose of being relieved of their burden or obstruction, the lever F is brought down, which causes the frame A A A A to pitch forward, causing the heads of the rakes to rise with the back sill, d, on which they rest.

What I claim as my invention, and desire to secure by Letters Patent, consists—

1. In the additional tooth inserted in the handle (so termed) of each rake near and forward the head, forming a double-toothed rake, for the purpose as described in this specification.

2. The combination of the rakes with the tilting frame A, as herein described, by which each rake can rise separately, and the whole of them can be raised by means of the lever E, in the manner and for the purpose substantially as herein described.

GEO. DAVIS.

Witnesses:
W. BENEDICT,
SAML. FAIRLAMB.